United States Patent
Posey et al.

(10) Patent No.: US 6,709,735 B2
(45) Date of Patent: Mar. 23, 2004

(54) OXYGEN BARRIER COATING AND COATED FILM

(75) Inventors: Robert Posey, Duncan, SC (US); Edwin C. Culbertson, Greer, SC (US)

(73) Assignee: Mitsubishi Polyester Film, LLC, Greer, SC (US)

(*) Notice: Subject to any disclaimer, the term of this patent is extended or adjusted under 35 U.S.C. 154(b) by 27 days.

(21) Appl. No.: 10/292,783

(22) Filed: Nov. 12, 2002

(65) Prior Publication Data

US 2003/0124365 A1 Jul. 3, 2003

Related U.S. Application Data

(60) Provisional application No. 60/332,742, filed on Nov. 14, 2001.

(51) Int. Cl.[7] .......................... B32B 15/08; B32B 27/08; B32B 27/30; B32B 27/36
(52) U.S. Cl. ..................... 428/215; 428/35.8; 428/36.6; 428/213; 428/336; 428/339; 428/457; 428/458; 428/461; 428/463; 428/480; 428/483; 427/372.2; 427/385.5; 427/393.5; 427/404; 427/407.1; 427/412.1; 427/412.5; 525/56; 525/57; 525/60; 525/191; 525/221; 525/231; 526/317.1; 526/318.3; 526/318.5
(58) Field of Search ................................ 428/35.8, 36.6, 428/213, 215, 332, 334, 335, 336, 339, 457, 458, 461, 463, 480, 483; 427/372.2, 384, 385.5, 393.5, 404, 407.1, 412.1, 412.5; 525/56, 57, 60, 191, 221, 231; 526/317.1, 318.3, 318.5

(56) References Cited

U.S. PATENT DOCUMENTS

| 3,322,553 | A | 5/1967 | Seifried et al. |
| 4,571,363 | A | 2/1986 | Culbertson et al. |
| 4,927,689 | A | 5/1990 | Markiewicz |
| 5,330,831 | A | 7/1994 | Knoerzer et al. |
| 5,350,601 | A | 9/1994 | Culbertson et al. |
| 5,552,479 | A | 9/1996 | Tanaka et al. |
| 5,560,988 | A | 10/1996 | Oba et al. |
| 5,574,096 | A | 11/1996 | Tanaka et al. |
| 5,658,676 | A | 8/1997 | Prissette et al. |
| 5,764,262 | A | 6/1998 | Wu et al. |
| 5,773,092 | A | 6/1998 | Prissette et al. |
| 5,972,472 | A | 10/1999 | Uschold et al. |
| 5,984,467 | A | 11/1999 | Bodager et al. |
| 6,143,408 | A | 11/2000 | Fujita |
| 6,165,529 | A | 12/2000 | Yang et al. |
| 6,197,409 | B1 | 3/2001 | Bodager et al. |

FOREIGN PATENT DOCUMENTS

| EP | 0665264 A1 | 8/1995 |
| EP | 0698634 B1 | 2/1996 |
| EP | 0885919 | 12/1998 |
| EP | 0782931 B1 | 10/1999 |
| EP | 1086981 A1 | 3/2001 |
| GB | 1411564 | 10/1975 |
| JP | 2002-194265 | 7/2002 |
| WO | WO9822550 | 5/1998 |
| WO | WO9945045 | 9/1999 |

Primary Examiner—Vivian Chen

(57) ABSTRACT

A film with excellent oxygen barrier properties is disclosed. A barrier coating used thereon is also disclosed, including polyvinyl alcohol and a copolymer of maleic acid and acrylic acid, and wherein the copolymer of maleic acid and acrylic acid has a weight average molecular weight of about 3500 to about 5000. The barrier coating is typically less than about 1 micrometer in thickness and provides an oxygen barrier of less than about 0.3 cc.mil/100 in$^2$/day/atm when tested at 23 degrees Celsius and 0 percent relative humidity according to ASTM D3985. A method of stripping low molecular eight fractions from the copolymer is also disclosed. Metallized coated film according to the present invention shows surprising barrier properties.

25 Claims, 1 Drawing Sheet

O2TR vs. Coating Thickness

US 6,709,735 B2

OXYGEN BARRIER COATING AND COATED FILM

This Application claims the benefit of U.S. Provisional Application No. 60/332,742, filed Nov. 14, 2001.

BACKGROUND OF THE INVENTION

1. Field of the Invention

The present invention relates generally to a method for creating an oxygen barrier film, typically a polymer film, by means of coating the film with a barrier coating containing a copolymer of maleic acid and acrylic acid in combination with a film former, such as polyvinyl alcohol. The barrier coating, which is preferably transparent, is also disclosed.

2. Description of Related Art

Barrier coatings are desirable for many applications, such as food packaging and other product packaging. These barrier coatings minimize transmission of oxygen, and water vapor to varying degrees, through the coated substrate. For many end uses, it is desirable for the coating to be clear. When the substrate is also clear, as in a transparent polymer film, view through the substrate is not obstructed. However, known barrier coatings have suffered from numerous limitations, including high cost, inadequate transparency and limited barrier properties. There is a need for barrier coatings that address one or more of these problems. A need also exists for barrier coatings that are adapted for application to polymer film substrates. Coatings adapted for in-line application during film manufacture are also desirable.

A standard barrier coating includes polyvinylidene chloride. Such a coating is typically solvent based, which may render the associated coating processes environmentally hazardous. In addition, because of possible solvent residue in the coating, these polyvinylidene chloride coatings may pose some risk when used to package food items. These coatings also are not reclaimable, and decompose to give off HCl vapors if recycled. Furthermore, such coatings are coated off-line after film orientation is complete. This usually requires thick coatings that are not economically optimal, and additional processing steps that render the coated film more expensive.

Known barrier coatings also include certain polyvinyl alcohol poly(meth)acrylic acid-based coatings. These coatings apparently require very substantial heat treatment and substantial coating thicknesses to achieve good oxygen barrier properties. Furthermore, such coatings are coated off-line after film orientation is complete. This requires additional processing steps that render the coated film more expensive.

BRIEF SUMMARY OF THE INVENTION

Accordingly, it is an object of the present invention to provide a barrier coating suitable for application to a base polymer film.

It is a further object of the present invention to provide a base polymer film with a barrier coating on one or both sides.

It is another object of the present invention to provide a barrier coating that is substantially free of streaks and smears, particularly when applied to a base polymer film.

It is yet another object of the present invention to provide a barrier coating that is substantially transparent.

It is a further object of the present invention to provide a barrier coating having good oxygen barrier properties.

It is another object of the present invention to provide a barrier coating that is cost efficient to make and apply.

It is a further object of the present invention to provide a barrier coating that is suitable for food packaging.

It is another object of the present invention to provide a barrier coating that performs well at high humidity.

It is a further object of the present invention to provide a film that when metallized provides improved barrier properties.

The present invention has accomplished these objectives by providing in a preferred embodiment a coated polymer film having a coating that includes a copolymer of maleic acid and acrylic acid in combination with a film-former, preferably polyvinyl alcohol. This coating is applied thinly, preferably via in-line coating methods, to achieve a thin coating that provides good oxygen barrier properties.

DETAILED DESCRIPTION OF THE INVENTION

Figure 1:
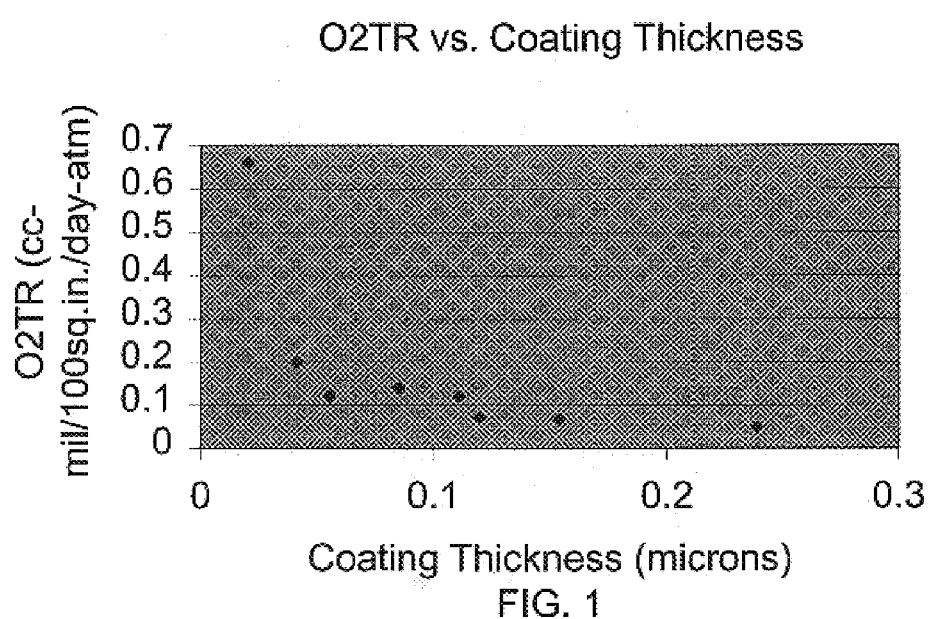
FIG. 1 is a graph showing oxygen barrier properties versus coating thickness.

The present inventors have surprisingly found that excellent oxygen barrier properties are provided by a coating that includes an aqueous solution a copolymer of maleic acid and acrylic acid in combination with polyvinyl alcohol, even when applied thinly to polymer film.

Preferred barrier coatings of the present invention include a copolymer of maleic acid and acrylic acid. Preferred poly(maleic acid-co-acrylic acid) copolymers have an average molecular weight of about 1500 to about 15,000 and an alternating structure. It is believed that conventional block copolymers do not provide enhanced performance. At very high copolymer molecular weights, gelation of the film former can occur. A preferred copolymer is the poly(maleic acid-co-acrylic acid) copolymer commercially available from Sigma-Aldrich of Milwaukee, Wisconsin under the product number 41605-3. The copolymer is preferably used at about 50 to about 95 weight percent of the solids of the composition, alternatively at about 60 to about 90 weight percent of the solids of the composition, or further at about 70 to about 80 weight percent of the solids of the composition.

It has been learned that the molecular weight profile of the poly(maleic acid-co-acrylic acid) used in the coating of the present invention is critical to the proper manufacture of coated film. Free maleic acid forms maleic anhydride in the heat of the tentering, potentially causing irritation. As typically provided, e.g., from Sigma-Aldrich, the average molecular weight (all molecular weights referenced in this disclosure are weight average molecular weights unless explicitly noted to the contrary) is approximately 3000, and the molecular weight distribution includes numerous low molecular weight fractions. It has surprisingly been found that higher average molecular weight polymers, preferably about 3500 to about 5000 average molecular weight, alternatively about 3700 to about 4700 average molecular weight, permit the formation of a viable coating with minimal off-gassing. In an alternate preferred embodiment, a similar result can be achieved by subjecting the poly(maleic acid-co-acrylic acid) to a steam stripping or distilling process (collectively referred to as stripping), preferably azeotropic distillation, to remove substantial amounts of low molecular weight fractions. Preferably, fractions of molecular weight of about 500 or below are targeted and removed by this process. A conventional steam stripping process as is known in the art may be used. In addition, it is preferred to neutralize the coating to a pH of approximately 3 or higher. Alone or in combination, these steps permit the formation of an excellent barrier coating under low offgassing conditions.

The barrier coatings of the present invention preferably also include a film former, preferably a water-based polymeric film-forming material. The film former can minimize brittleness of the copolymer coating. A preferred film former is polyvinyl alcohol. Preferably, the polyvinyl alcohol is a substantially hydrolyzed cold water insoluble polyvinyl alcohol. The polyvinyl alcohol is preferably used at about 5 to about 50 weight percent of the solids of the composition, alternatively at about 10 to about 40 weight percent of the solids of the composition, or further at about 20 to about 30 weight percent of the solids of the composition. A preferred polyvinyl alcohol is commercially available from Celanese, Ltd. under the tradename Celvol.

Other components are preferably included in coatings according to the present invention. A crosslinker is preferably added to the barrier coatings. A preferred crosslinker is a dialdehyde crosslinker, more preferably a glyoxal crosslinker. A glyoxal crosslinker is commercially available from Hoechst Celanese as Glyoxal 40N. The crosslinker is preferably present at about 3 to about 6 percent by weight based on solids, alternately at about 5 percent. At higher levels, barrier properties can begin to deteriorate. At lower levels, the further enhanced moisture resistance provided by the crosslinker is not typically seen.

It is also preferred to add a defoamer to the coating composition. Non-silicone, hydrocarbon-based alcohol defoamers are preferred. Preferably, an acetylene-type, single component defoamer is used. A preferred, proprietary defoamer is available from Transchemco as Trans280. It is preferable to use as little defoamer as possible. Approximately 50 parts per million based on solids of coating provides good results.

In addition, a surfactant can be added to the coating. Furthermore, a starch can be added to the coatings of the present invention. Preferred starches for use in the coatings of the present invention include cold water soluble starches. Antimicrobials, such as triclosan or methylparaben, can also be included (the preferred polyvinyl alcohol includes a trace amount of biocide). Other plasticizers, such as glycerin, may also be added to the coatings of the present invention.

Thus, a polymer film coated with a barrier coating of the present invention (often at greatly reduced thicknesses) is ideally suited for food packaging and is believed to be suitable for other uses requiring food contact or contact with other ingestible substances such as pharmaceuticals. The coated film has excellent resistance to both solvents and water. In preliminary testing, a 121 degree Celsius, two hour extraction gave no detectable extract from the coating.

A preferred coating solution includes about 2 to about 3 percent by weight of polyvinyl alcohol, and about 7 to about 8 percent by weight of poly(maleic acid-co-acrylic acid). Water is preferably about 50 to about 99 weight percent of coating solutions according to the present invention; alternately about 80 to about 95 weight percent.

The ingredients of the barrier coating are preferably formulated as a dispersion or solution in water or a water-containing solvent. Alternatively, alcohols or other suitable organic solvents can be employed, alone or in combination with water. The solids level is preferably up to about 50 weight percent, alternatively about 0.01 to about 30 weight percent, more preferably about 5 to about 15 weight percent.

A benefit of the coatings of the present invention is their ability to achieve good oxygen barrier properties with reduced coating thicknesses. The coating amount needed is reduced, which minimizes cost, improves transparency and optimizes the coated film or other substrate for packaging applications. While greater thicknesses may be used and are desirable for certain applications, coating thicknesses in the range of about 0.01 to about 1 micron thick are preferred. Alternately, thicknesses of about 0.04 to about 0.12 microns are preferred. Thicknesses of about 0.06 to about 0.08 microns are typically targeted.

Oxygen barrier properties are typically measured in cc.mil/100 in$^2$/day/atm. Oxygen barrier properties of about 0.3 cc.mil/100 in$^2$/day/atm or less are generally targeted for good barrier properties. Coatings of the present invention preferably provide even lower transmission rates of about 0.2 cc.mil/100 in$^2$/day/atm or less, depending on coating thickness. Values of about 0.1 cc.mil/100 in$^2$/day/atm or less can also be achieved. Users typically desire any improvement in barrier properties, and this dramatic improvement is both unexpected and beneficial. Known polyvinyl alcohol coatings are believed to have no better than 0.24 cc.mi/100 in$^2$/day/atm transmission rates, particularly without lengthy heat treatment. Thus, the coatings of the present invention provide a substantial improvement in barrier properties over known coatings, particularly at dramatically reduced coating thicknesses. Dry laydown rates of about 1 to about 50 pounds per million square feet (about 0.005 to about 0.25 grams per square meter) provide commercially viable oxygen barrier properties.

In addition, as referenced above, known film coatings containing polyvinyl alcohol have poor performance at high humidity. The coatings of the present invention are believed to address this limitation and to provide improved performance under conditions of high humidity. Conventional PVOH coatings are known to exhibit reduced oxygen barrier properties as relative humidity increases, typically at greater than about 60% relative humidity, with oxygen transmission rates increasing steeply as relative humidity increases. Coatings of the present invention, even at reduced thicknesses, and even with only very brief exposures to high heat, have much more stable oxygen barrier properties at high humidity. Performance may actually increase at higher humidity levels. Oxygen barrier properties of coatings of the present invention have been seen to remain stable at relative humidity levels of up to about 90%. This dramatic improvement in oxygen barrier properties at high humidity it vital for many end uses, and was unexpected and surprising. It is preferred that a film of the present invention has an oxygen barrier transmissivity that does not increase more than about 0.1 cc.mil/100 in$^2$/day/atm as relative humidity is increased from 60% to 70%. Furthermore, the film can have an oxygen barrier transmissivity that does not increase more than about 0.1 cc.mil/100 in$^2$/day/atm as relative humidity is increased from 60% to 80%.

It was not expected that such thin layers of the coatings of the present invention would provide such desirable barrier properties, let alone that they would be compatible with polyester film substrates and conventional film coating technology. Coatings of the present invention provide good oxygen barrier properties at surprisingly low coating thickness. FIG. 1 demonstrates the excellent oxygen barrier properties at very low coating thicknesses for a preferred coating of the present invention (7% copolymer, 3% PVOH).

Coatings of the present invention also provide surprising synergies when metallized. Barrier films are often metallized to enhance barrier properties, for aesthetic purposes, or for other reasons. Conventional methods known in the art may be used. Typical metallization levels of approximately 2.4 optical density are frequently used. Metallization is conventionally performed utilizing vacuum deposited aluminum atoms. The resulting layer is formed of the aluminum atoms. Coatings of the present invention provide unexpected improvements in barrier properties when metallized, in comparison with uncoated films that have been metallized or in comparison with metallized films having conventional metal adhesion undercoatings. Without intending to be bound by theory, it is believed that the coatings of the present invention enable the formation of metal-oxygen bonds that enhance oxygen barrier properties.

For optimal water vapor barrier properties, the coated polymer film (preferably polyester film) can be laminated to polyethylene films, such as those known to provide good water barrier properties. Metallization can also lower water vapor transmission.

While the films of the present invention are preferably transparent, the coatings and/or film substrates of the present invention do not need to be clear and may in various embodiments be opaque. Nonetheless, for many applications, transparent films and coatings are preferred. The polyvinyl alcohol and copolymer of maleic acid and acrylic acid enable the formation of a transparent coating. Total haze is a preferred method of measuring the clarity of a polyester film, which can determine its suitability for such films as clear barrier film. Haze is measured based on ASTM Method D1003-61, Procedure A, "Haze and Luminous Transmittance of Transparent Plastics", using a BYK Gardner "Haze Gard Plus" instrument.

Conventional additives that are known in the art can be included in the barrier coatings of the present invention. For example, pigments, other colorants, stabilizers, antistatic agents, adhesion promoters, antioxidants, delusterants, fillers, plasticizers and the like can be included in the barrier coatings of the present invention. Generally it is preferred that only low levels of such additives be used, if any are used at all.

As mentioned above, while thin coatings are most cost-effective, the barrier coatings of the present invention are suitable for application at much higher levels, and certain coatings may be suitable for co-extrusion.

The coating compositions of the present invention can be formulated by simply combining the desired coating components. Agitation may be used to insure an even dispersion or solution.

Base Film

For many preferred uses of the coating and method of the present invention, a polymer film substrate is most useful. It provides a lightweight, substantially transparent, inexpensive, disposable or recyclable substrate that accommodates many of the end uses of barrier films. In addition, the coated polymer film can also easily be laminated by heat bonding or by adhesives to various other substrates.

The barrier coatings and coating methods of the present invention are applicable to any polymeric film capable of acting as a substrate for a barrier coating. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, of mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art.

In addition, the base polymer film may be a polymer laminate. Such laminates include polymer-polymer laminates like polyester-polyolefin or polyester-adhesive-polyolefin, polymer-metallic laminates such as polyester-aluminum, or polymer-paper or polymer-adhesive-paper laminates. Coated polymer films or film laminates can also be used. Primer coatings used to enhance wet-out or coating adhesion are preferred examples of such coatings.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with monoaxial orientation being less preferred. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C. It is preferred that the coated films of the present invention be exposed to heat of about 215° C. to about 225° C. for a period of about 1 to about 20 seconds, alternately for about 2 to about 10 seconds. For thin films, it is preferred that the residence time in the crystallizer that these temperatures be no more than about 5 seconds.

The coated films of the present invention are reclaimable. Waste coated material can readily be incorporated with new resin for re-extrusion.

Alternate Substrates

As discussed above, the coatings and methods of reducing oxygen transmission of the present invention are not limited to use on polymer film bases. Alternate substrates can be coated according to the teachings of the present invention. Any substrates that exhibit oxygen permeability, such as polymeric films, will benefit from the barrier properties of the coating. Furthermore, it is envisioned that polymer films coated with the coatings of the present invention can also be applied to other surfaces, including irregular surfaces, to provide barrier properties to those surfaces. The film may be heat bonded or adhered to the surface, or can be mechanically attached via fasteners, clips and the like.

Coating Methods

In-line coating of the base polymer layer, in which the coatings are applied during the film manufacturing process and before it is heat-set, is the preferred method for use of the coatings disclosed herein. Typically, the base polymer film is coated after corona treatment and prior to the stretch orientation of the film as described in British Patent No. 1,411,564, or coated between drawing steps (when biaxially oriented film is produced) as taught by U.S. Pat. No. 4,571,363, or coated post-draw as taught by U.S. Pat. No. 3,322,553.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

While surface modification of the base polymer film prior to coating is not required, it has been found that better results are obtained if the surface or surfaces of the base polymer film are modified before application of the coatings of the present invention. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 1.0 watt per square foot per minute is typically sufficient to achieve the desired results. In addition, primer or other intermediate layers can optionally be used between the polymer film and the barrier coating.

In light of the foregoing, a preferred method of controlling oxygen transmission through polymer film is provided herein. Preferably, one or both faces of a base polymer film are coated with a barrier coating of the present invention. Optionally, if only one face is coated with the barrier coating of the present invention this coating can occur before, after or at the same time the opposite face of the base polymer film is coated with an alternate coating.

EXAMPLE SERIES A

Various coatings were formulated as set forth in the following table. Each coating was coated using an in-line coating process system onto biaxially oriented polyester film. The finished film samples were tested for oxygen transmission levels at ASTM D3985 standard conditions of 23 degrees Celsius and 0% relative humidity. These examples show the viability of the coatings of the present invention as barrier coatings. Because measurements were taken at 0% relative humidity, this example series is not intended to demonstrate the surprising ability of coatings of the present invention to maintain oxygen barrier properties at high humidity.

| Sample No. | Coating Formulation | Dry Laydown (lbs/million sq. ft.) | Oxygen Transmission (cc. mil/100 in$^2$/day/atm) | Total Solids (weight percent) |
|---|---|---|---|---|
| 1 (C) | none | 0 | 4.90 | 0 |
| 2 (C) | PVOH (4%) | 3.8 | 0.24 | 4 |
| 3 (C) | PVOH (3%) + PAA (250000 MW) (1%) | 6.2 | 0.20 | 4 |
| 4 (C) | PVOH (3%) + PAA (5000 MW) (1%) | 6.8 | 0.19 | 4 |
| 5 (C) | PVOH (1%) + PAA (5000 MW) (3%) | 20.6 | 1.12 | 4 |
| 6 (C) | PVOH (4%) + PAA (2000 MW) (4%) | 5.1 | 0.33 | 8 |
| 7 | PVOH (3%) + PMA-co-PA (3000 MW) (1%) | 6.7 | 0.26 | 4 |
| 8 | PVOH (1%) + PMA-co-PA (3000 MW) (3%) | 8.8 | 0.47 | 4 |
| 9 | PVOH (3%) + PMA-co-PA (3000 MW) (7%) | 7.7 | 0.23 | 10 |

Examples 7 through 9 show that they possess viable oxygen barrier properties similar to those of known coatings shown in comparative examples 1 through 6. Even at lower PVOH levels, which are preferred for their lower viscosity, viable oxygen transmission properties are indicated.

EXAMPLE SERIES B 48 gauge polyester film, both uncoated and coated with a preferred coating according to the present invention (7% PAA/MA, 3% PVOH), was metallized by vacuum deposition of aluminum to an optical density of 2.5, a conventional practice for packaging films. Oxygen transmission rates were measured.

| Film Type | Oxygen Permeation Rate (cc/100 in$^2$/day/atm) |
|---|---|
| Uncoated and metallized | average value: 0.080 |
| Coated and metallized | average value: 0.014 |

Thus, in comparison with uncoated metallized film and typical metallized film having conventional metal-adhesion coatings (which have oxygen barrier properties equivalent to those of uncoated metallized film), metallized films having the coatings of the present invention show dramatically reduced oxygen transmission rates.

EXAMPLE SERIES C 12 micron thick polyester film, both uncoated and coated at various extremely low thicknesses with a preferred coating according to the present invention (7% PAA/MA, 3% PVOH), was metallized by vacuum deposition of aluminum to an optical density of 2.5, a conventional practice for packaging films. Oxygen transmission rates were measured.

| PAA/MA/PVOH (microns) | Metallized O2TR(cc/100 sq.in./day) | Unmetallized O2TR |
|---|---|---|
| .0108 | .118 | 8.38 |
| .0125 | .134 | |
| .0162 | .134 | |
| .0204 | .134 | 6.86 |
| .0292 | .080 | |
| .0294 | .070 | 4.67 |
| .0366 | .068 | |
| .0385 | .070 | |
| .0411 | .060 | |
| .0438 | .056 | 3.49 |
| .0462 | .050 | |
| .0517 | .068 | |
| .0586 | .048 | |
| .0602 | .046 | |
| .0612 | .049 | |
| .0926 | .028 | |

Reference Data:

Plain 12 micron PET (no coating, no metal): O2TR=9.60 cc/100 sq.in./day

Coated (7% PAA/MA, 3% PVOH, 4% Glyoxal) (@ 0.099 microns) (no metal): O2TR=0.48 cc/100 sq.in./day (O2TR=0.18 without Glyoxal crosslinker at comparable thickness)

Metallized 12 micron PET (no coating): O2TR=0.23 cc/100 sq.in./day

Thus, even at dramatically lower coating weights, which alone would provide little improvement over uncoated film, synergy is seen with the metal layer. Excellent barrier properties result. Synergy is also seen at higher coating weights. For metallization end uses, preferred coating thicknesses are about 0.001 to about 0.07 microns, alternately 0.01 to about 0.05 microns, alternately about 0.02 to about 0.04 microns. Preferred metal layer thicknesses are from about 0.1 to about 20 optical density, alternately about 0.05 to about 10 optical density, further about 1 to about 5 optical density.

EXAMPLE SERIES D

A 12 micron polyester film was coated off-line with various thicknesses of a preferred coating according to the present invention (7% PAA/MA 3% PVOH, no crosslinker). The following data demonstrate the thickness-dependency of the oxygen transmission properties. Transmission properties are seen to be slightly better than for otherwise identical coatings including crosslinkers, demonstrating that the superior moisture-resistance provided by the crosslinker has a slight negative effect on oxygen transmission properties.

| Coating(microns) | O2TR (cc/100 sq.in./day) |
|---|---|
| .024 | .660 |
| .049 | .200 |
| .066 | .120 |
| .110 | .140 |
| .133 | .120 |
| .143 | .072 |
| .185 | .064 |

The present invention having been thus described with particular reference to the preferred forms and embodiments thereof, it will be obvious to one of ordinary skill in the art that various changes and modifications may be made therein without departing from the spirit and scope of the invention.

What is claimed is:

1. A coated film comprising:

a polyester base film layer;

a barrier coating applied to said base film layer;

wherein said barrier coating comprises polyvinyl alcohol and a copolymer of maleic acid and acrylic acid; and wherein said barrier coating is less than about 1 micrometer in thickness;

said coated film providing an oxygen barrier of less than about 0.3 cc.mil/100 in$^2$/day/atm when tested at 23 degrees Celsius and 0 percent relative humidity according to ASTM D3985;

and wherein said copolymer of maleic acid and acrylic acid has a weight average molecular weight of about 3500 to about 5000.

2. The coated film of claim 1, wherein said copolymer has an average molecular weight of about 3700 to about 4700.

3. The coated film of claim 1, wherein said copolymer is primarily made up of an alternating structure of maleic acid and acrylic acid monomers.

4. The coated film of claim 1, wherein said copolymer is present at about 50 to about 95 weight percent of solids of said barrier coating.

5. The coated film of claim 1, wherein said polyvinyl alcohol is substantially hydrolyzed.

6. The coated film of claim 1, wherein said polyvinyl alcohol is present at about 5 to about 50 weight percent of solids of said barrier coating.

7. The coated film of claim 1, wherein said barrier coating has a thickness of about 0.04 to about 0.12 microns.

8. The coated film of claim 1, wherein said coated film has an oxygen barrier transmissivity of no more than about 0.2 cc.mil/100 in$^2$/day/atm.

9. The coated film of claim 1, wherein said coated film has an oxygen barrier transmissivity of no more than about 0.1 cc.mil/100 in$^2$/day/atm.

10. The coated film of claim 1, wherein said film has an oxygen barrier transmissivity that does not increase more than about 0.1 cc.mil/100 in$^2$/day/atm as relative humidity is increased from 60% to 70%.

11. The coated film of claim 1, wherein said film has an oxygen barrier transmissivity that does not increase more than about 0.1 cc.mil/100 in$^2$/day/atm as relative humidity is increased from 60% to 80%.

12. The coated film of claim 1, further comprising a metal layer.

13. The coated film of claim 12, wherein said barrier coating is about 0.001 to about 0.07 microns thick.

14. The coated film of claim 12, wherein said metal layer has an optical density of about 0.1 to about 20.

15. A coated film comprising:
a polymer base film layer;
a barrier coating applied to said base film layer; and
a metallized layer;
wherein said barrier coating comprises a copolymer of maleic acid and acrylic acid, and a film former.

16. The coated film of claim 15, wherein said film former comprises polyvinyl alcohol.

17. The coated film of claim 16, wherein said polyvinyl alcohol is substantially hydrolyzed.

18. The coated film of claim 15, wherein said base film layer comprises polyester.

19. A method of forming a film with enhanced oxygen barrier properties, comprising the steps of:
applying a coating to said film,
wherein said coating includes polyvinyl alcohol and a copolymer of maleic acid and acrylic acid that has been subjected to a stripping process capable of removing low molecular weight fractions.

20. The method of claim 19, wherein said coating is applied to said film in-line during film manufacture.

21. The method of claim 19, further comprising the step of metallizing said film.

22. The method of claim 19, further comprising the step of heating the film.

23. The method of claim 22, wherein said film is heated to about 190 degrees Celsius to about 240 degrees Celsius.

24. The method of 22, wherein said film is heated for about 1 to about 20 seconds.

25. The method of claim 22, wherein said film is heated in a crystallizer.

* * * * *